United States Patent [19]
Seybold

[11] 3,741,011
[45] June 26, 1973

[54] METHOD AND APPARATUS FOR MEASURING THE INTERNAL VOLUME OF MOULDS AND SIMILAR CAVITY MEMBERS

[75] Inventor: Rolf Seybold, Solingen, Germany

[73] Assignee: Egon Evertz, Solingen, Germany

[22] Filed: May 28, 1971

[21] Appl. No.: 147,733

[52] U.S. Cl. .................................................. 73/149
[51] Int. Cl. ............................................ G01f 17/00
[58] Field of Search ...................................... 73/149

[56] References Cited
UNITED STATES PATENTS

| | | | |
|---|---|---|---|
| 2,353,792 | 7/1944 | Sowell | 73/149 |
| 2,226,340 | 12/1940 | Flood | 73/428 |
| 3,211,321 | 10/1965 | Holmes | 73/323 |

FOREIGN PATENTS OR APPLICATIONS

| | | | |
|---|---|---|---|
| 200,873 | 10/1967 | U.S.S.R. | 73/149 |
| 108,512 | 8/1917 | Great Britain | 73/149 |

Primary Examiner—S. Clement Swisher
Attorney—Holman & Stern

[57] ABSTRACT

A method for measuring the internal volume of moulds or similar cavity members in which there is provided a filling member of known external volume which is arranged so as to substantially fill the volume of the mould or cavity member, and a filling member is introduced into the mould or cavity member so that a gap remains between the filling member and the internal wall and the gap being filled to a definable height with a flowable granular material of known bulk weight. The granular material disposed within the mould or cavity member is thereafter discharged and its weighable value measured so that the internal volume of the mould or similar cavity member can be determined.

13 Claims, 2 Drawing Figures

PATENTED JUN 26 1973  3,741,011

METHOD AND APPARATUS FOR MEASURING THE INTERNAL VOLUME OF MOULDS AND SIMILAR CAVITY MEMBERS

BACKGROUND OF THE INVENTION

The invention relates to a method and apparatus for measuring the internal volume of inter-alia, moulds and similar cavity members and more particularly but not exclusively to such moulds or cavity members wherein the internal space thereof is of substantial magnitude and deviates from the simplest geometrical shapes.

Measuring such internal volumes is necessary in numerous cases, for example in order to uniformly distribute a given quantity of steel over a given number of moulds or in order to produce ingots of a precisely defined weight in such moulds. However, the internal volume cannot normally be readily measured by reference to the geometrical internal dimensions of the mould. This is due to the fact that the internal shapes cannot be readily measured by geometrical means. Moulds of this kind are usually constructed in conical form. Furthermore, the surfaces have a curvature which may also vary along the longitudinal length of such a mould. If internal wear has taken place due to prolonged use of the mould there will also be an increase of volume which cannot be predefined. This is also the case when it is necessary for an uneven or cracked internal mould surface to be reconditioned by stock removal methods. Insufficiently accurate knowledge of the internal volume becomes more serious the greater the value of the material which is to be cast into such a mould. Many attempts have been made to define the internal volume by so-called liquid measurement. To this end it is, however, necessary for the mould to be first placed onto an absolutely sealing-tight base. Furthermore, it is difficult, particularly in the case of large volumes, to define the quantity of water required for measurement with sufficient accuracy. Substantial difficulties are also encountered if the mould cannot be placed upright for the purpose of liquid measurement but is available only in the horizontal state.

OBJECTS AND SUMMARY OF THE INVENTION

It is an object of the invention to provide a method and apparatus for measuring the internal volume of, inter alia, moulds and similar cavity means in an improved form.

In accordance with the present invention, there is provided a method for measuring the internal volume of moulds or similar cavity members, characterized in that a filling member of known external volume which is arranged so as to substantially fill the volume of the mould or cavity member, is introduced therein so that a gap remains between said filling member and the internal wall and in that subsequently the gap is filled to a definable height with a flowable granular material of known bulk weight and in that thereafter the granular material disposed within the mould or cavity member thus is discharged and its weight or volume is measured.

In this way it becomes surprisingly possible for the entire internal volume to be measured with a substantially better accuracy and substantially smaller effort than in the known method using a liquid. The conditions for measuring the volume of a vertical mould as well as of a horizontal mould are also satisfied. Moreover, by definition the granular material in the bulk state encloses within it cavities which have not been filled and the individual particles of the granular material are in physical contact with each other only at certain positions. Accordingly, thermal conduction within the granular material is substantially prevented so that the disturbing temperature effect which accompanies liquid measurement can be substantially avoided.

The present invention is incorporated with particular advantage into an overall process for the repair of chill moulds used in steel works. Within the scope of this entire process the internal surfaces of these chill moulds damaged due to use, are first reworked. Such reworking may be performed by the action of flame, by grinding, milling and/or shaving. Such operation also includes the filling up of local cavities by welding in order to equalize the surface. It is advisable for such internal working to be performed even when the first surface cracks occur in use of a chill mould. The proposed measurement of the internal volume of the worked chill mould is then performed following on such internal working. Since the internal volume is greater than the initial volume, the mould is shortened by the required amount so that it will once again have the same initial volume as in the new state.

The invention therefore represents the basis for a particularly effective method according to which used chill moulds may be re-used while retaining their original volume.

A filling member of known external volume, substantially occupying the internal volume is thus introduced into the chill mould which is prepared by internal treatment of the kind described hereinabove.

In order to ensure that the gap between the internal wall and the filling member is completely filled, no position of said filling member is narrower than a dimension equal to 2.5 times the maximum diameter of the individual particles of the granular material. It is furthermore advantageous to use as granular synthetic resin, balls which retain their form stability under the weight of their dumping height. Should any slight elastic deformation occur it can be compensated by performing the weight/volume comparison of the granular material on which the measurement is based at a dumping height which approximately corresponds to the dumping height which accompanies the actual volumetric measurement. To this end, the diameter of individual particles of the granular material vary appropriately between 0.5 mm and approximately 2 mm. In order to avoid on the one hand any changes of bulk weight due to demixing and on the other hand in order to maintain a sufficient cavity volume it is appropriate to employ granular material with a particle size which is as uniform as possible.

Satisfactory introduction of the granular material into a chill mould or similar cavity member already containing the filling member is obtained under the effect of gravity. This can be assisted still further if the granular material is introduced by means of a vacuum generated at a position disposed at a distance from its filling position. This procedure, in particular, enables the chill mould or cavity member to be measured when it is positioned horizontally.

In order to obtain a function of the volume relative to the longitudinal length of the chill mould or cavity member, and after the filling member has been introduced, the granular material is poured in at least partially in known volumetric quantities, the filling height on the filling member being measured after each individual fill. In this way it is possible for a plurality of individual measuring heights to be recorded so that the function of the volume relative to the height can be represented with a high degree of accuracy.

With the method according to the invention and with relatively little effort it is also possible to obtain the longitudinal length or height of the chill mould or cavity member respectively in relation to a predefined volume. Under these conditions, the height or longitudinal length to be measured on the filling member on the one hand and the volume of granular material on the other hand are initially two unknown quantities. After the filling member is introduced, a known quantity of granular material, corresponding approximately to the predefined volume with due reference to the anticipated filling member height is introduced. The actual volume which is obtained relative to the filling member height is then measured. Finally, one or more changes, appropriately additions, to the amount of granular material poured in are then made under conditions in which there is adequate correspondence between the predefined volume and that of the total amount of granular material poured in, in conjunction with the volume of the filling member height actually reached. Finally, when the predefined volumetric value is approached with sfficient closeness, the height obtained thereby is marked.

After filling in of the granular material and after determination of the filling height, the granular material is extracted by suction means into a receiver vessel. To this end, the filling member may first be withdrawn and the granular material collected in the chill mould or cavity may be drawn off by means of a vacuum generator. This procedure can also be combined with an operation in which before the quantity of granular material is measured, impurities of the granular material are separated in the receiver vessel.

The apparatus for performing the method always comprises a filling member the external volume of which in relation to its longitudinal length is known and whose appropriate longitudinal length is measurable. To this end it is also possible for the filling member to be constructed as a cavity member. Measurement is assisted in that said member has a transparent wall, at least in zones, with a measuring scale for its longitudinal length being advantageously disposed in the zone of said wall. Means for measuring the appropriate longitudinal length can also be introduced particularly simply into the filling member which is constructed as a cavity member. In the simplest case this may be a measuring rod or a vertically adjustable inspection mirror system.

A filling member, constructed in pressure-tight form and adapted for connection to a vacuum generator and furthermore being perforate in the manner of a screen which is disposed at a position a distance from that at which the granular material is filled in, is provided for filling in such granular material with the screen apertures being smaller than the diameter of the smallest individual particle of the granular material. The entire position disposed at a distance may be situated at the filling member end disposed opposite to the filling position or it may be disposed in the middle of the filling member. The last mentioned embodiment offers the advantage that the chill mould or cavity member may be filled with granular material from both its ends so that the path to the suction position is shortened and a correspondingly higher pressure gradient is retained.

The filling member is furthermore constructed with one or two discs, tightly sealing same, and being disposed at a distance corresponding to the longitudinal length of the chill mould or cavity member and being adapted to retain said filling member with the specified wall gap in the chill mould or cavity member respectively. To this end, one of the two discs may be constructed with a connection for a suction unit which is preceded by a collecting vessel with apertures which are smaller than the diameter of the smallest individual particle of the granular material. Accordingly, extraction after filling is accompanied by separation of dust or similar impurities so that the weight of the filled in granular material can be precisely measured.

The filling member may be appropriately assembled from a plurality of single sections for use in differently shaped chill moulds or cavity members. Furthermore, it may also be constructed in foldable form from walls of sufficient rigidity.

The invention will now be more particularly described with reference to the accompanying drawings wherein:

DETAILED DESCRIPTION OF THE INVENTION

Figure 1:
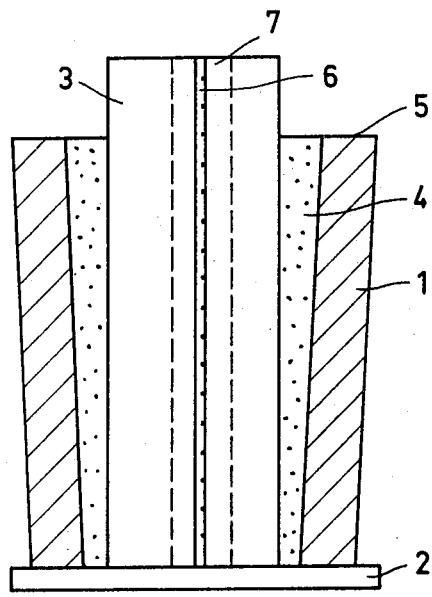
FIG. 1 illustrates one embodiment of apparatus for performing the method according to the present invention, and, FIG. 2 illustrates a further embodiment of the apparatus for performing the method accoding to the present invention.

Referring to FIG. 1 a chill mould 1 or a like member such as a conically constructed cavity member, is placed upon a smooth surface 2 constituting a base. A filling member 3 is also placed on the base 2 at the aforementioned distance from the internal wall of the chill mould 1. A gap 4 between the mould 1 and the filling member 3 has been filled with granular material whose bulk weight is known; in this case it was required to measure the total volume so that the granular material was filled in to the height of upper edge 5 of the mould 1. The height of the upper edge 5 is indicated by a measuring scale 6 whereupon the filling member 3 is removed and the granular material collecting at the bottom of the mould 1 is drawn off and finally weighed. As shown when the filling member is constructed with a partially transparent wall 7 which also supports the measuring scale, the volume relative to the appropriate height may be obtained directly in the manner described hereinabove by successively pouring in discrete and known amounts of granular material. The same method as described hereinabove may also be employed for measuring the height of a given volume in it-erative manner.

Figure 2:
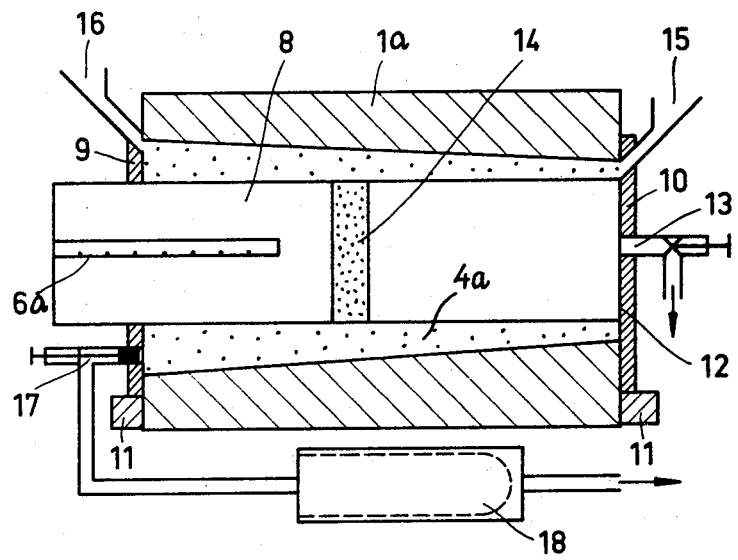

In the embodiment illustrated in FIG. 2, the volume of the chill mould 1a or a similar cavity member is to be measured with the bore of the mould extending in a horizontal direction. To this end, a filling member 8 is provided at each end with discs 9 and 10 respectively of which one may be constructed as an annular disc and may be slidable on said filling member 8. The discs adapted to support the filling member 8 are backed by support members 11 so as to produce the intended gap 4a between the filling member and the internal wall of the chill mould or cavity member. One end 12 of the filling member 8 which is provided with a cavity is also provided with a closable connection 13 which is connected to suction means (not shown). A central zone 14 of the filling member 8 is perforate in a screen like manner so that a pressure gradient, acting towards the center, is produced when said suction means are connected. The granular material which is fed in through two funnels 15 and 16, may thus be drawn into the gap 4a. After the filling has been completed, the granular material is drawn off by the suction means through a connection 17 provided at the lower part of one of the two sides, so that the granular material is transferred into a bag18 from which it is finally removed for the purpose of measuring the weight or of the volume.

I claim:

1. A method for measuring the internal volume of moulds or similar cavity members, characterised in that a filling member of known external volume which is arranged so as to substantially fill the volume of the mould or cavity member, is introduced therein so that a gap remains between said filling member and the internal wall and in that subsequently the gap is filled to a definable height with a flowable granular material of known bulk weight and in that thereafter the granular material disposed within the mould or cavity member thus is discharged and its weight or volume is measured.

2. A method according to claim 1, characterised in that the width of said gap does not fall below 2.5 times the maximum diameter of the particles of the granular material at any position.

3. A method according to claim 1 characterised in that the granular material consists of synthetic resin balls which are form-stable under the weight of the granular material dumping height.

4. A method according to claim 1, characterised in that the diameter of the particles of granular material varies between approximately 0.5 mm and approximately 2 mm.

5. A method according to claim 1 characterised in that the granular material is of uniform particle size.

6. A method according to claim 1 characterised in that the granular material is introduced by means of a vacuum established at a position disposed at a distance from its in-filling position.

7. A method according to claim 1, characterised in that after the introduction of the filling member the granular material is poured in at least partially in known volumetric quantities and the filling height is measured on the filling member after each filling phase.

8. A method according to claim 1, characterised in that for measuring the height of the chill mould or the cavity member corresponding to a given volume and after introduction of the filling member a known quantity of granular material approximately corresponding to the given volume and by reference to the anticipated filling member height is poured in and that thereafter and in conjunction with the actual volume is measured and that finally one or more changes are made to the amount of granular material poured in with the provisor that there is sufficient correspondence between the given volume and that of the total amount of granular material poured in as well as of the volume obtained for the height of the filling member whereupon this height is marked.

9. A method according to claim 1, characterised in that after the granular material is poured in and the filling height has been measured, the granular material is extracted by suction means into a receiving vessel.

10. A method according to claim 9, characterised in that impurities in the granular material are separated in the receiving vessel before the quantity of granular material is measured.

11. An apparatus for measuring the internal volume of moulds or similar cavity members comprising a mould or cavity member, a filing member of known external volume arranged within the mold or cavity member so as substantially fill the volume of the mold or cavity member and provide a gap between the filling member and the mold or cavity member, so that the gap can be subsequently filled to a definable height with a flowable granular material of known bulk weight, with the granular material being discharged and it's weight or volume measured, the filling member being constructed in pressure-tight form, a vacuum generator to which the filling member is connectible said filling member being perforate in screen-like manner at a position which is disposed at a distance from the position of pouring in the granular material, the screen apertures being smaller than the diameter of the smallest particle of the granular material.

12. An apparatus for measuring the internal volume of molds or similar cavity members comprising a mold or cavity member, a filing member of known external volume arranged within the mold or cavity member so as to substantially fill a volume of the mold or cavity member and provide a gap between the filling member and the mold or cavity member, the gap being subsequently filled to a definable height with a flowable granular material of known bulk weight, with the granular material within the mold or cavity member being discharged and it's weight or volume measured, the filling member being provided with two discs for closing the filling member in sealing-tight manner, said discs being disposed at a distance from each other which corresponds to the longitudinal extension of the mould or the cavity member and retain said filling member at the specified spacing in the mould or the cavity member.

13. The Apparatus according to claim 12 characterised in that one of the discs is provided with a connection for suction means and with a receiving vessel to be interposed therebetween and having apertures which are smaller relative to the diameter of the smallest particle of the granular material.

* * * * *